United States Patent [19]
Gundrum

[11] Patent Number: 5,549,020
[45] Date of Patent: Aug. 27, 1996

[54] AUTOMOTIVE MANUAL TRANSMISSION SHIFTING MECHANISM

[76] Inventor: William W. Gundrum, 581 Moyer's Station Rd., Schuylkill Haven, Pa. 17972

[21] Appl. No.: 308,520

[22] Filed: Sep. 19, 1994

[51] Int. Cl.⁶ .............................. B60K 23/00; F16H 57/02
[52] U.S. Cl. .......................... 74/606 R; 403/343; 403/345
[58] Field of Search ........................... 74/606 R; 403/342, 403/343, 345, 354, 361, 364, 375

[56]  References Cited

U.S. PATENT DOCUMENTS

| | | | |
|---|---|---|---|
| 1,574,315 | 2/1926 | Sweet | 74/606 R X |
| 1,625,555 | 4/1927 | Linquist | 74/606 R |
| 1,821,890 | 9/1931 | Heck | 74/606 R |
| 1,973,332 | 9/1934 | Church | 74/606 R X |
| 4,782,719 | 11/1988 | Yarnell | 74/606 R |

FOREIGN PATENT DOCUMENTS

| | | | |
|---|---|---|---|
| 19121 | 8/1915 | United Kingdom | 403/343 |
| 407535 | 3/1934 | United Kingdom | 74/606 |

*Primary Examiner*—Charles A. Marmor
*Assistant Examiner*—Nathan O. Jensen

[57]  ABSTRACT

A modified shift housing and shift mechanism for a manually shifted automotive transmission is provided by replacing the existing shift housing and complicated components for activating the selector shafts. The modified shift housing is provided with bored passageways to accommodate three connecting rods which forwardly link to a remotely located shifter and rearwardly engage the existing selector shafts, thereby eliminating the more complex and delicate shift linkage mechanism normally used with VOLKSWAGEN automotive transmissions.

12 Claims, 3 Drawing Sheets

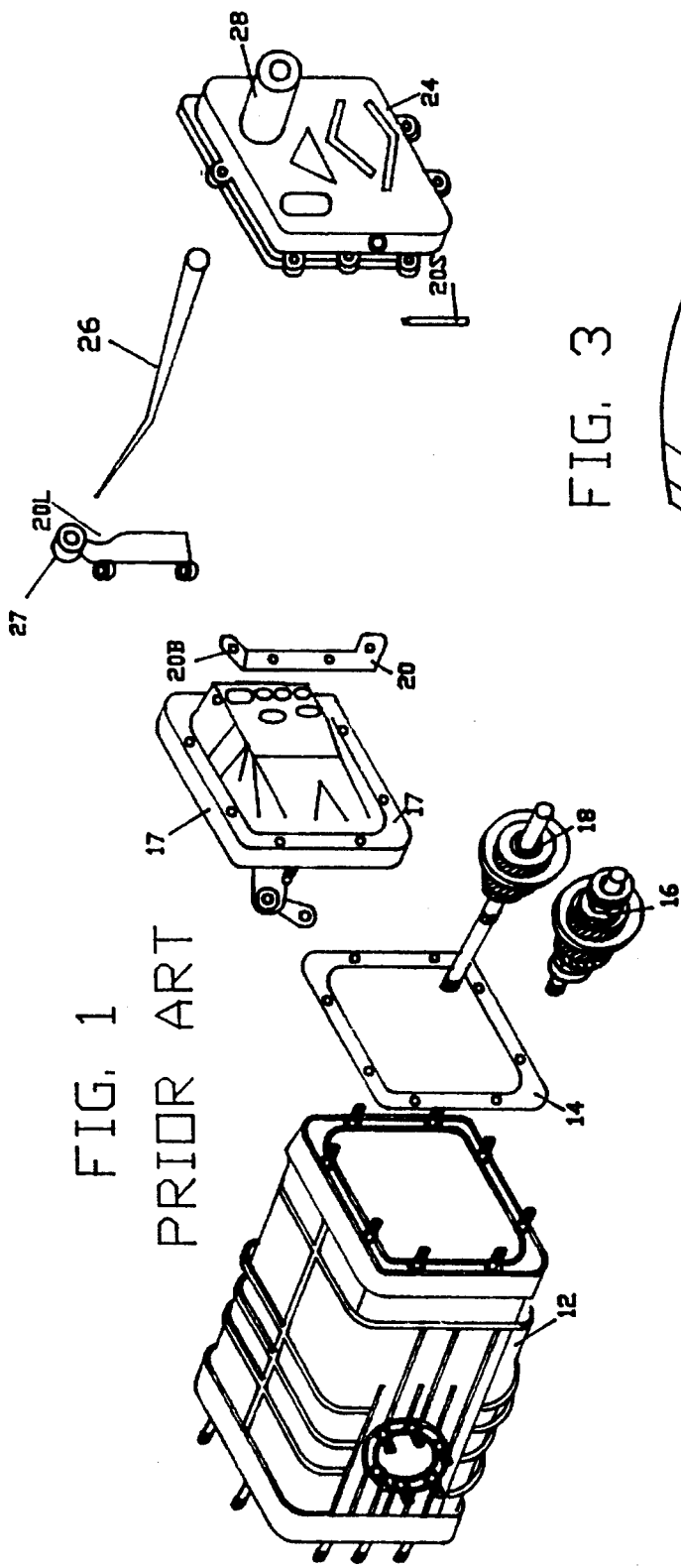
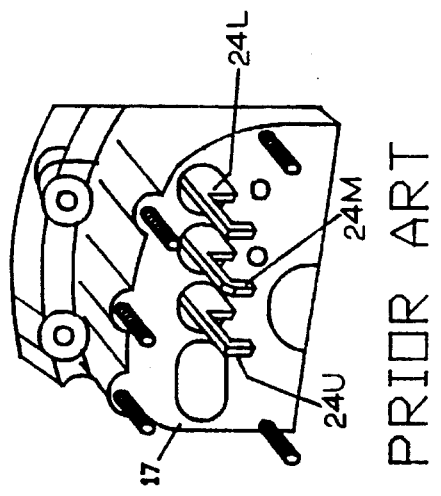
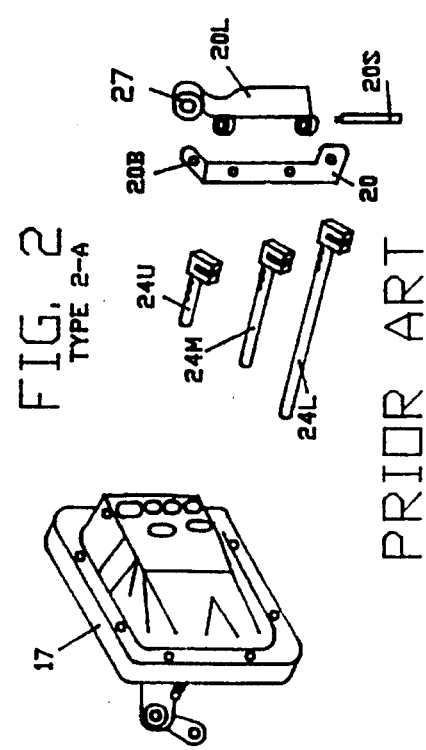

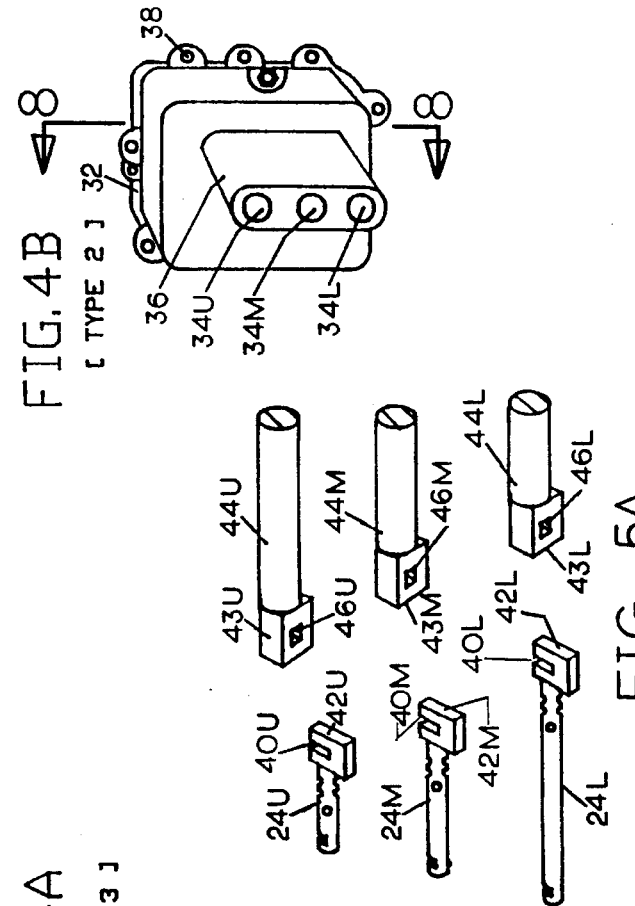
FIG. 4B [TYPE 2]
FIG. 5B
FIG. 5A
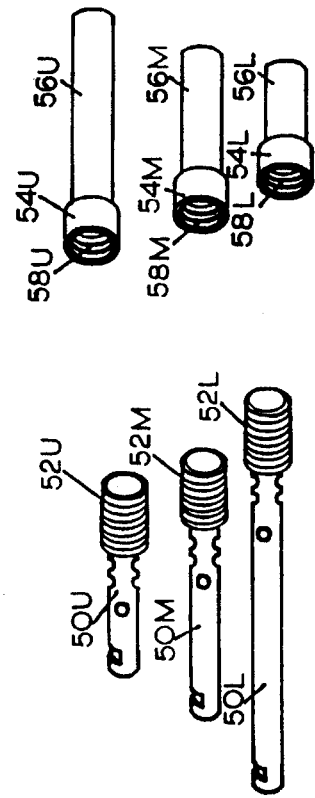
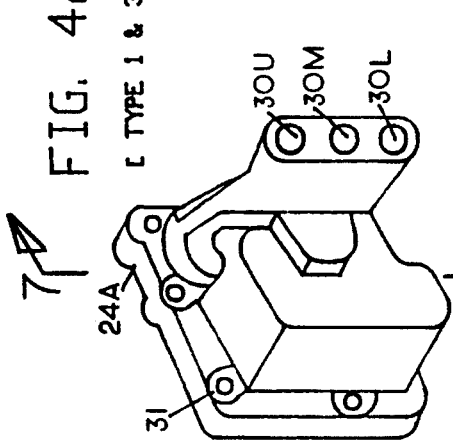
FIG. 4A [TYPE 1 & 3]
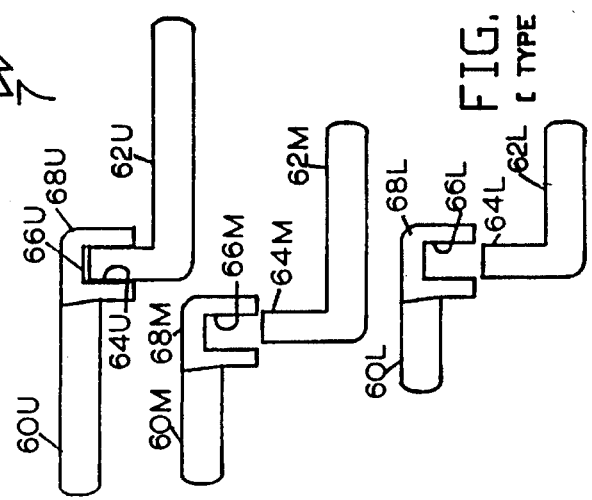
FIG. 5C [TYPE 1 & 3]

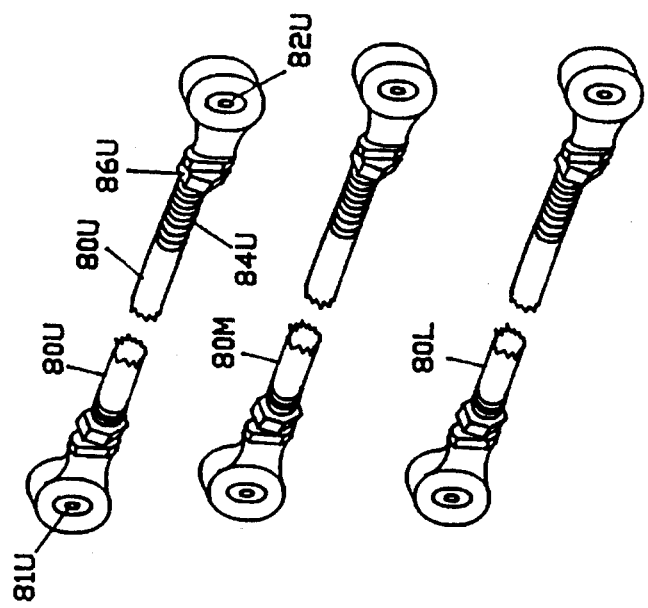
FIG. 6
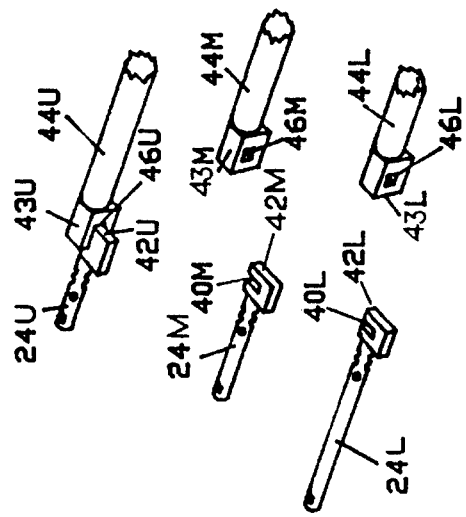
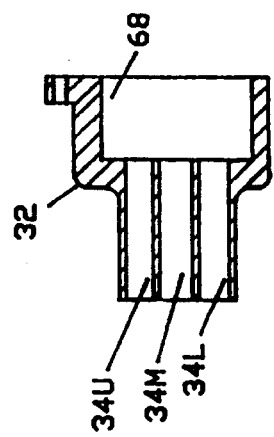
FIG. 8
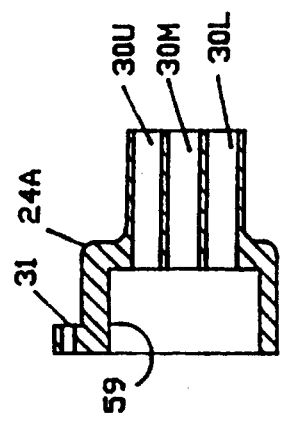
FIG. 7

5,549,020

AUTOMOTIVE MANUAL TRANSMISSION SHIFTING MECHANISM

This invention is a mechanism to manually shift transmission gears from a remote shift lever and provide more reliable and quicker shifting for drag racing, offroad racing, etc.

BACKGROUND OF INVENTION

Manually shifted automotive transmissions, wherein used in normal transportation and normal driving conditions, are quite reliable. In particular, the VOLKSWAGEN automobile transaxle (transmission) has proven to be very dependable through years of service; however, when used in competitive events such as drag racing or offroad racing, very hard, split-second and positive shifts are demanded. This demand exceeds the design of the shift mechanism in the VOLKSWAGEN automobile transmission. Consequently, gear changes often fail regardless of the type of gear changer used.

Many times the transmission stays locked in second gear as the associated linkage goes on to attempt to select another gear (third gear). The transmission is then inoperative, being locked in second gear with no other gears available until repairs are made to the transmission. In other case the VOLKSWAGEN automobile shift linkage is subject to bending, making gear selection impossible. Either condition eliminates the vehicle from competition and is unacceptable in a competitive event.

The objective of this invention is to provide a more dependable, positive, quicker shifting mechanism than is provided in the production model transmission by:

Providing a gear shift housing and connecting rods that eliminate shifting problems (sticking in gear, linkage jamming, etc.);

Providing a gear shift housing and connecting rods that can be installed on VOLKSWAGEN automobile transmission without having to disassemble or modify the transmission;

Providing a gear shift housing and connecting rods that can readily be installed on a VOLKSWAGEN automobile transmission and easily be linked to an external gear changer (shifter);

Eliminate complicated shift linkage normally installed on the gear carrier of the VOLKSWAGEN automobile transmission thereby making gear selection more dependable, positive and fast, while requiring less shifting effort, as is required in competition.

SUMMARY OF THE INVENTION

The present invention gains these advantages by replacing the existing shift housing and associated shift linkage with a newly cast shift housing in which is provided three vertically stacked bores. These bores are sized to slidingly support the connecting rods which are used to engage the existing selector shafts which traverse the gear carrier and the transmission housing to select various gear ratios.

In the first application, the existing prior art selector shafts (three) project from the existing prior gear carrier and are provided with a U-shaped notch and a hook-like end that offers a method of the connecting shift linkage. Three connecting rods are newly manufactured with a rectangular broached opening to coincide with the configuration of the selector shaft whereby by the connecting rod and the selector shafts are interlocked. Interlock is aligned and secured by the shift housing and the connecting rod assembly being fastened to the gear carrier by the existing bolts.

In a second application, the existing selector shafts are provided with a C-shaped opening for linkage connection. In this case, the connecting rods are manufactured with an L-shaped end. The "L" portion of the connecting rod engages into a "C" portion of the selector shaft. Alignment and engagement are assured as the shift housing is attached by the existing bolts to the gear carrier.

Third, components are as previously described, however the selector shaft projecting ends are provided with male threads. The engaging ends of the connecting rods are bored and tapped to provide a positive connection of the selector shaft and the connecting rod.

In all applications, connecting rods project from the shift housing extending toward the front of the vehicle when the transmission is installed. The exposed ends of the connecting rods accept the shift rods which offer a means of engaging a manually operated gear changer (shifter).

BRIEF DESCRIPTION OF DRAWINGS

FIG. 1 is an exploded view of prior art VOLKSWAGEN automobile transmission components. From left, the transmission case, the mainshaft with associated gears, the drive pinion and gears, the gear carrier, the shift linkage and the shift housing 24.

FIG. 2 is a detail of the gear carrier with the gear selector shafts (seen also in FIG. 1 with transmission case) which when mounted on the transmission case, serves to support the rear portion of the mainshaft and the pinion shaft as well as providing mounting for the shift housing. Also shown are the mechanical linkage components to be replaced by this invention as described in detail later.

FIG. 3 is a portion of the prior art gear carrier (FIG. 2) with the selector shafts in the normal position to accomplish gear changes. The gear carrier is rotated 30 degrees in order to better show the U-shaped openings which provide an area to interlock with the connecting rods of this invention.

FIG. 4A is the shift housing used with the VOLKSWAGEN automobile Type I and III transmissions as modified (newly manufactured) to accept the connecting rods of the present invention. This is accomplished by providing three vertically stacked cylindrical bores to slidingly support the connecting rods (not shown) which will engage the projecting ends of the selector shafts. As the shift housing is affixed to the gear carrier, the connecting rods and the selector shafts are positively locked and aligned.

FIG. 4B is an alternate shift housing (VOLKSWAGEN automobile Type II) seen in FIG. 1 modified to receive the connecting rods by means of vertically stacked, cylindrically bored passegeways and allows engaging of the selector shafts (FIG. 3).

FIG. 5A is a detail of the coupling method of the selector shafts and the connecting rods as applies to VOLKSWAGEN automobile Type II transmissions.

FIG. 5B is an alternate means of coupling the selector shafts and the connecting rods by providing male threaded ends on the selector shaft and female threaded ends on the connecting rods, thereby solidly coupling the shaft and the rod.

FIG. 5C is a coupling of VOLKSWAGEN automobile Type I and III transmission components. The prior art selector shafts are manufactured with C-shaped rectangular openings into which the L-shaped ends of present invention connecting rods engage.

The selector shaft/connecting rod coupling depicted in FIG. 5A is used with VOLKSWAGEN automobile Type II transmission. FIG. 5B represents an alternate coupling for VOLKSWAGEN automobile Type I and III as well as VOLKSWAGEN automobile Type II transmission. The coupling means of FIG. 5C is associated with VOLKSWAGEN automobile Type I and III transmissions.

FIG. 6 is a detail of the components of this invention readied for assembly onto a VOLKSWAGEN automobile Type II transmission. The upper left depicts a coupled conventional selector shaft and connecting rod. The center is the shift housing which will accept the connecting rods. The connecting rods extend from the cylindrical bores of the shift housing to provide mountings for the shifter rods (right) and thereby engage a manual gear changer (shifter) to accomplish gear changes.

FIG. 7 is a cross-sectional view of VOLKSWAGEN automobile Type I and III shift housing of FIG. 4A.

FIG. 8 is a cross-sectional view of Volkswagen automobile Type II shift housing of FIG. 4B.

DETAILED DESCRIPTION OF DRAWINGS

Using FIG. 1 as a reference, the major components of a prior art VOLKSWAGEN automobile transmission are depicted. Gear case 12 houses forward and reverse gear sets supported on the main shaft and pinion shaft 16 and 18. This case also houses the differential; hence it is a transaxle. However, the present invention is concerned only with the transmission and in reference, the term "transmission" is used rather than "transaxle". The main shaft and the pinion shaft 16 and 18 are rearwardly mounted/supported by means of bearings in gear carrier 17. Sub-assembly 16/17/18 inserts into case 12 and is affixed by means of bolts and sealed by gasket 14. Gear selector linkage mount 20, bolted to the gear carrier, supports selector 20L by means of pin 20S. Shift lever 26 extends through shift housing 24 by means of cylindrical bore 28. Shift lever 26 engages shift ball joint 27 and selects gears by means of vertical and horizontal movements of selector 20L. Shift lever 26 projects forward (toward front of vehicle) and has provisions for a single shift tube attached to a front located shifter controlled by the vehicle operator.

FIG. 2 is a detailed view of the prior art gear carrier and associated components. Selector shafts 24L, 24M and 24U extend through the gear carrier 17 and select gears by means of shift forks engaged in sliding sleeves (not shown). U-shaped ends of selected shafts 24L, 24M and 24U protrude from gear carrier 17 into a cavity of the shift housing 24, FIG. 1. Looking to the right is the selector linkage. Selector linkage mount 20, pivot pin 20S, selector 20L and ball joint 27 are purposely eliminated in the present invention. Their function is replaced by a method to be later described.

In FIG. 3, gear carrier 17 is rotated 90 degrees to allow a detailed view of selector shafts 24L, 24M and 24U as they protrude from gear carrier 17 to allow engagement of the connecting rods of the present invention. It is the function of shaft 24L to select first or second gear. Shaft 24M engages reverse and shaft 24U selects third or fourth gear as in prior art.

FIG. 4A represents the modified shift housing 24A used in VOLKSWAGEN automobile Type I and III transmission. The shaft housing (a new casting) is altered to provide cylindrical bores 30L, 30M and 30U to slidingly support connecting rods 62L, 62M and 62U, (FIG. 5C). Connecting rods 62L, 62M and 62U engage with prior art selector shafts 60L, 60M and 60U, (FIG. 5C) respectively as the selector shafts extend through the prior art gear carrier to select gears as required.

As seen in FIG. 4B, the modified (new casting) shift housing 32, previously depicted as prior art of VOLKSWAGEN automobile Type II in FIG. 1, #24. The modifications include: a new aluminum casting 32, replacing projecting support 28 of prior art shift housing 24, (FIG. 1) with three vertically stacked bored and bushed supports 34L, 34M and 34U. Aforementioned support bore 34L receives connecting rod 44L, (FIG. 5A) which couples with selector shaft 24L by interlocking connecting rod end 43L with prior art selector shaft end 42L. Selector shaft 24L then extends through prior art gear carrier 17 shown in FIG. 1 and FIG. 2. Connecting rod 44L and selector shaft 24L are then joined as a unit to accomplish gear changes as required. Likewise, connecting rod 44M couples with selector shaft 24M to perform the same function. The coupling and operation of connecting rod 44U and selector shaft 24U is the same as previously described Mounting holes 38 of shift housing 32 remain in the same pattern and diameter as in prior art shift housing 24 (FIG. 1), thus allowing new casting 32 to be affixed to prior art gear carrier 17 of FIG. 1. This properly aligns connecting rods 44L, 44M and 44U with selector shafts 24L, 24M and 24U. Shift housing 32 is fastened to gear carrier 17 (FIG. 1) by means of the prior art bolts thus supporting the connecting rods and providing a positive coupling to connecting rods 44L, 44M, 44U and selector shafts 24L, 24M and 24U.

An alternate embodiment is depicted in FIG. 5B. Connecting rod 56L is provided with an enlarged end (54L) which is bored and internally tapped (58L) to accept the externally threaded end 25L of selector shaft 50L. The connecting rod/selector shaft unit then operates as previously described. In the same manner connecting rod 56M is jointed with selector shaft 50M as externally threaded 52M enters internally tapped (58M) end of 54M. Similarly connecting rod 56U is coupled with selector shaft 50U by threading 52U into tapped (58U) end of 54U.

Looking to FIG. 5C the coupling method of VOLKSWAGEN automobile Type I and III transmission is depicted. Connecting rod 62L is passed through and supported by bore 30L of shift housing 24A, (FIG. 4A). Connecting red 62L engages prior art selector shaft 60L by entering the connecting rod L-shaped end 64L into C-shaped opening of the selector shaft end 68L. Connecting rod 62M and color shaft 60M couple similarly as do connecting rod 62U and selector shaft 60U. The connecting rod/selector shaft units then function to change gears as previously described.

FIG. 6 is a detailed breakdown of shift housing 32 (Prior Art 24, FIG. 1 ) and its associated components which operate gear changes in VOLKSWAGEN automobile Type II transmissions. Viewing from left (top) shows prior art selector shaft 24U as projected from prior art gear carrier 17 (FIG. 3) coupled with connecting rod 44U by means of engaging U-shaped end 42U with broached end 43U. Selector shaft 24M and connecting rod 44M couple similarly as do selector shaft 24L and connecting rod 44L. Connecting rods 44L, 44M and 44U pass through and are slidingly supported by cylindrically bored and bushed passageways 34L: 34M, and 34U. When shift housing 32 is fastened to prior art gear carrier 17 (FIG. 1), by means of existing bolts, the selector shafts/connecting rods are correctly aligned and positively coupled to allow operation (gear changes from a remote shifting device controlled by vehicle operator). Continuing to the right, connecting rods 44L, 44M and 44U are depicted as extending from shift housing 32 to provide a method of coupling to gear changer (shifter). Rods 44L, 44M and 44U, are machined and drilled to allow swivel joints 81U robe fastened by bolts. Shift rods 80L. 80M and 80U extend to remote shifter (front of vehicle). Swivel joints 82U are similarly attached to the shifter (not shown) which allows the vehicle operator to complete extremely fast, positive and effortless gear changes as required in heavy duty and/or racing situations. Shift rod 80U is shown with threaded end 82U and lock nut 86U which provides a method of securing swivel joint 82U after proper adjustment of shift rod 80U. Having eliminated prior art shift linkage components bracket 20, selector 20L, pivot pins 20S, shift lever 26 and ball joint 27, the invention insures shifts with no jamming or locking in gear. Thus the possibility of not completing a competitive event due to transmission failure is greatly reduced.

FIG. 7 displays a sectioned view of shift housing 24A (used with VOLKSWAGEN automobile Type I and III transmissions) seen in FIG. 4A. Cavity 59 serves to house the projecting prior art selector shaft ends of 60L. 60M and 60U (FIG. 5C). On the right side of the figure cylindrical bores 3CL, 30M and 30U accept and slidingly support connecting rods 62L. 62M and 62U (FIG. 5C). The selector shafts/connecting rods are interlocked via 66L/66L, 64M/66M and 64U/66U. Having been thus connected, recess 59 allows required space for the selector shaft/connecting rod to move laterally approximately one half inch each direction to accomplish shifts. Housing 24A is affixed to prior art gear carrier utilizing bores 31 and existing bolts (not shown), thus properly aligning and supporting the selector shaft/connecting rod.

Similarly, FIG. 8 is a section view of shift housing 32 as shown in FIG. 4B used with VOLKSWAGEN automobile Type II transmissions and serves in the same manner as shift housing 24A, FIG. 7. However, shift he,using 32 accommodates selector shafts 4L/24M 24U and connecting rods 44L/44M/44U of FIG. 6.

The previously described shift housing is machined from a newly designed and produced aluminum casting with cylindrical bores and provisions to mount to the prior art transmission without modification to or disassembly of said transmission. The connecting rods are machined from steel bar stock while the coupling means is machined onto ends of the connecting rods and properly hardened to prevent wear or breakage.

The present invention employs at least three methods of the selector shaft/connecting rod interlock to accommodate various racing requirements without departing from the scope of the present invention as defined in the following claims.

I claim:

1. In a manually operated motor vehicle transmission including a gear casing, mainshaft and pinion shaft with associated gear sets, a gear carrier and a shift housing connected to a remotely operated gear changer, an improved shift housing and associated operating components comprising the following:

three selector shafts each provided with a projecting U-shaped end to enable a method of operating said selector shafts;

three connecting rods with the transmission oriented ends machined with a matching broached rectangular opening to provide a snug coupling with the U-shaped ends of the selector shafts; the forward projecting ends of the selector shafts are associated with the transmission and when connected with the broached ends of the connecting rods eliminate component bending and gear jamming associated with these transmissions;

a shift housing machined to accommodate the forwardly projecting ends of the selector shafts as they are oriented normally in gear carriers;

a set of three vertically stacked cylindrical bored and bushed passageways, each designed to slidingly support the connecting rods as part of the shift housing.

2. In a manually operated motor vehicle transmission including a gear casing, mainshaft and pinion shaft with associated gear sets, a gear carrier and a shift housing connected to a remotely operated gear changer, an improved shift housing and associated operating components comprising the following:

three selector shafts each provided with a projecting C-shaped end to enable a method of operating said selector shafts;

three connecting rods with the transmission oriented ends machined with an L-shaped projection to interlockingly connect into the C-shaped ends of the selector shafts; the forward projecting ends of the selector shafts are associated with the transmission and when connected with the L-shaped ends of the connecting rods eliminate component bending and gear jamming associated with these transmissions;

a shift housing machined to accommodate the forwardly projecting ends of the selector shafts as they are oriented normally in the gear carriers;

a set of three vertically stacked cylindrical bored and bushed passageways, each designed to slidingly support the connecting rods as part of the shift housing.

3. In a manually operated motor vehicle transmission including a gear casing, mainshaft and pinion shaft with associated gear sets, a gear carrier and a shift housing connected to a remotely operated gear changer, an improved shift housing and associated operating components comprising the following:

three selector shafts each provided with a projecting externally threaded end to enable a method of operating said selector shafts;

three connecting rods with the transmission oriented ends machined with an internally threaded projection to interlockingly connect with the externally threaded ends of the selector shafts; the forward projecting ends of the selector shafts are associated with the transmissions and when connected with the internally the ended ends of the connecting rods eliminate component bending and gear jamming associated with these transmissions;

a shift housing machined to accommodate the forwardly projecting ends of the selector shafts as they are oriented normally in the gear carriers;

a set of three vertically stacked cylindrical bored and bushed passageways, each designed to slidingly support the connecting rods as part of the shift housing.

4. The shift housing according to claim 1, wherein a rectangular cast outward projection is provided to accommodate the three vertically stacked bored passageways, said connecting rods being remotely attached to the gear changer.

5. The shift housing according to claim 2, wherein a rectangular cast outward projection is provided to accommodate the three vertically stacked bored passageways, said connecting rods being remotely attached to the gear changer.

6. The shift housing according to claim 3, wherein a rectangular cast outward projection is provided to accommodate the three vertically stacked bored passageways, said connecting rods being remotely attached to the gear changer.

7. The shift housing according to claim 4 wherein the shift housing is designed to attach to the external vertical surface of the gear carrier utilizing the existing bolting configuration.

8. The shift housing according to claim 5 wherein the shift housing is designed to attach to the external vertical surface of the gear carrier utilizing the existing bolting configuration.

9. The shift housing according to claim 6 wherein the shift housing is designed to attach to the external vertical surface of the gear carrier utilizing the existing bolting configuration.

10. The shift housing according to claim 1 wherein the axial movement of the lower connecting rod acts on its respective selector shaft to engage first and second gear ratios; the center connecting rod/selector shaft combination engages the reverse gear ratio; and the upper connecting rod controls its respective selector shaft for third and fourth gear ratios.

11. The shift housing according to claim 2 wherein the axial movement of the lower connecting rod acts on its respective selector shaft to engage first and second gear ratios; the center connecting rod/selector shaft combination engages the reverse gear ratio; and the upper connecting rod controls its respective selector shaft for third and fourth gear ratios.

12. The shift housing according to claim 3 wherein the axial movement of the lower connecting rod acts on its respective selector shaft to engage first and second gear ratios; the center connecting rod/selector shaft combination engages the reverse gear ratio; and the upper connecting rod controls its respective selector shaft for third and fourth gear ratios.

\* \* \* \* \*